United States Patent [19]
Lord et al.

[11] Patent Number: 5,782,131
[45] Date of Patent: Jul. 21, 1998

[54] FLOODED COOLER WITH LIQUID LEVEL SENSOR

[76] Inventors: Richard G. Lord, 104 Somerset La., Tullahoma, Tenn. 37388; Arthur F. Friday, 306 Broadleaf Dr., NE., Vienne, Va. 22180; Kenneth J. Nieva, 7826 Restmoor Dr., Baldwinsville, N.Y. 13027

[21] Appl. No.: 672,744

[22] Filed: Jun. 28, 1996

[51] Int. Cl.⁶ .................................................. G01F 23/24
[52] U.S. Cl. .......................................... 73/295; 374/54
[58] Field of Search .......................... 62/125, 127, 129, 62/394; 73/295; 374/54

[56] References Cited

U.S. PATENT DOCUMENTS

| | | | |
|---|---|---|---|
| 2,125,842 | 8/1938 | Eggleston | 62/125 X |
| 2,158,059 | 5/1939 | Haines | 62/125 X |
| 3,279,252 | 10/1966 | Barlow | 73/295 |
| 3,485,100 | 12/1969 | Petersen | 73/295 |
| 4,532,799 | 8/1985 | O'Neill | 73/295 |

FOREIGN PATENT DOCUMENTS

| | | | |
|---|---|---|---|
| 8019 | 1/1987 | Japan | 73/295 |
| 255822 | 11/1987 | Japan | 73/295 |

Primary Examiner—Thomas B. Will
Assistant Examiner—Willie Morris Worth

[57] ABSTRACT

An improved cooler with level sensor for measuring variation in the liquid refrigerant level of a refrigerant within the cooler, comprises a cooler shell for holding the refrigerant, heat exchanger tubes for carrying the liquid to be cooled, and a liquid refrigerant level sensor comprising a probe extending to a point above the heat exchanger tubes, one or more thermistors; and a heating element. When the probe is totally within the vapor refrigerant above the heat exchanger tubes, the heater raises the temperature of the thermistors above the saturation temperature of the refrigerant. As the liquid refrigerant level begins to rise, the liquid refrigerant comes in contact with the outside of the probe. Since the heat transfer coefficient of the liquid refrigerant is significantly higher than that of the vapor refrigerant, the probe in that area is quickly cooled to the saturation temperature. This, in turn, increases the resistance of the nearby thermistor, causing the overall resistance of the thermistor circuit to increase. By measuring the resistance of the thermistor circuit, a porporant indication of the liquid refrigerant level can be obtained, and used to control an electronic expansion valve to adjust the liquid refrigerant level accordingly.

8 Claims, 2 Drawing Sheets

FLOODED COOLER WITH LIQUID LEVEL SENSOR

FIELD OF TECHNOLOGY

The technology of this application relates generally to coolers or evaporators for chiller systems, and more specifically to a flooded cooler or evaporator having a probe for measuring the level of the liquid in the cooler.

BACKGROUND AND SUMMARY

A chiller system is typically employed to chill water or other suitable liquids, and generally includes an evaporator or cooler through which the water passes, imparting its heat to a refrigerant within the cooler. Flooded coolers will generally have a cooler shell filled with refrigerant to a level sufficient to cover a heat exchanger (a bundle of heat exchanger tubes or any other type of heat exchange means) that carry the water (or other liquid to be cooled) through the cooler shell. As the heat from the water being cooled boils the refrigerant, the cooler shell fills with refrigerant vapor, and the liquid level of the refrigerant drops. To compensate for this, controls are typically activated to feed additional refrigerant to the cooler. It is desired to know how the liquid refrigerant level is varying, in order to keep the liquid refrigerant level at the proper level, so that liquid refrigerant continues to cover the heat exchanger. A level that is too high will cause carryover problems and too low a level will degrade performance.

In order to accomplish this function, conventional flooded coolers have either a fixed orifice or a float valve for control of the liquid refrigerant that is fed to the cooler and the liquid level inside the flooded cooler. An electro-mechanical switch to operate an electro-mechanical valve can also be operated with an electro-mechanical float sensor. Another possibility is to use an electronic expansion valve (EXV) for this purpose, but typical EXV's are controlled by superheat leaving the evaporator or cooler. Because there is no superheat with flooded coolers, controlling the level of refrigerant in a flooded cooler cannot be accomplished by measuring a superheated temperature and then controlling a valve.

As an alternative, the applicants have developed an improved cooler with level sensor for measuring variation in the liquid refrigerant level of a refrigerant within the cooler, comprising a cooler shell for holding the refrigerant, a heat exchanger for carrying a liquid to be cooled, and a liquid refrigerant level sensor comprising a thermistor circuit including a thermistor, a heating element for heating the thermistor, and a probe supporting the thermistor and the heating element, the probe extending at least to a point above the heat exchanger.

In one embodiment of the present invention, an electronic sensor to directly sense the liquid level in the cooler contains a series of thermistors and a small electric heater or heating element. The electronic sensor takes advantage of the different heat transfer coefficients of boiling liquid refrigerant and refrigerant vapor. The output from this sensor can then be used by electronic controls to determine liquid level in the cooler and then adjust the electronic expansion valve.

BRIEF DESCRIPTION OF THE DRAWING

For a fuller understanding of the nature and objects of the invention, reference should be made to the following detailed description to be read in connection with the accompanying figures of the drawing, in which.

DETAILED DESCRIPTION

Figure 1:
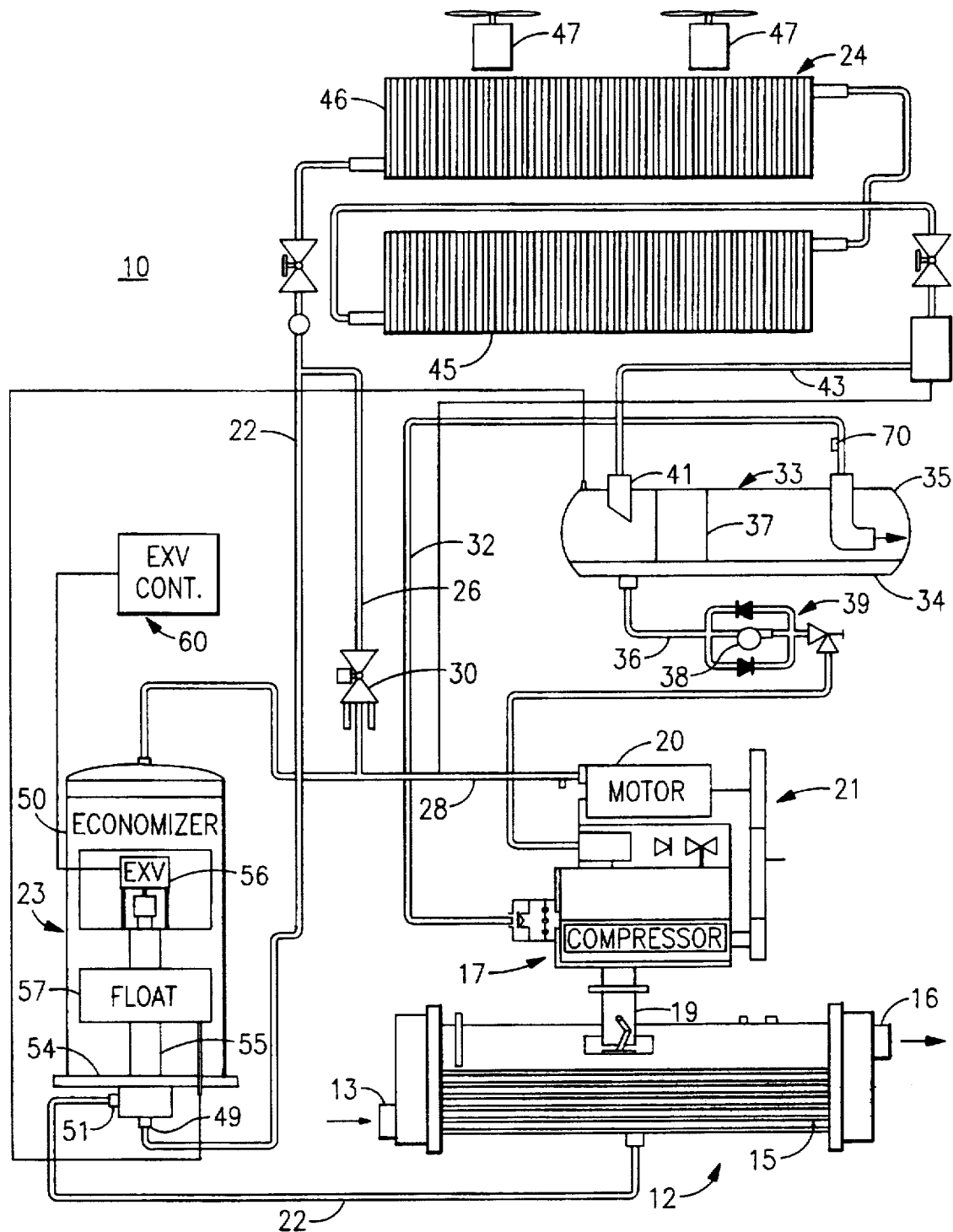
FIG. 1 is a schematic of one configuration of a chiller system utilizing an embodiment of the invention.
Figure 2:
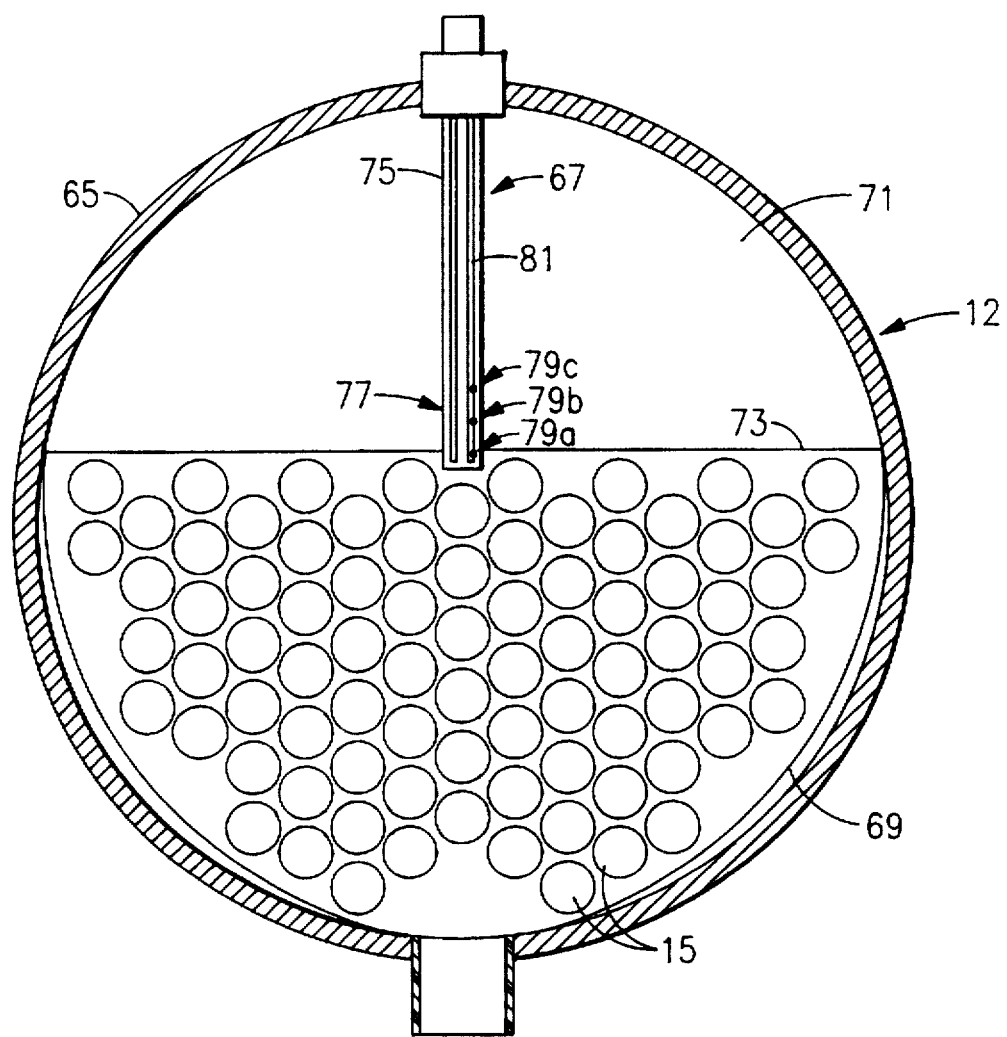
FIG. 2 is a cross-sectional view of an embodiment of the invention.

As background, and for familiarity with the various components of chiller systems, a chiller system 10 is discussed with reference to FIGS. 1 and 2. This type of chiller system is typically employed to chill water or other suitable liquid using a cooler 12. The cooler 12 shown in both FIGS. 1 and 2 are an embodiment of an improved cooler according to of the present invention In FIG. 1, water enters the cooler 12 through an inlet port 13 and is circulated through a series of heat exchanger tubes 15 before the water is discharged through an exit port 16. The cooler 12 is flooded with a low temperature liquid refrigerant that absorbs heat from the liquid being circulated through the heat exchanger tubes 15. Subsequently, the refrigerant liquid or gas is driven off and supplied to the compressor 17.

The compressor 17 shown in FIG. 1 is a screw compressor. The suction side of the compressor 17 is connected directly to the refrigerant outlet of the cooler 12 through means of a flanged coupling 19. The rotors of the compressor 17 are connected to a drive motor 20 via a gear train 21. As in the case of most screw compressors, lubricating oil is distributed to the rotors and the bearings of the machine and is compressed, along with the refrigerant, to a relatively high temperature and pressure.

As will be explained in greater detail below, the illustrated chiller system is equipped with an economizer 23 located in the liquid/vapor line 22 connecting the condenser section 24 and the evaporator section 12. In the economizer, a portion of the refrigerant moving between the condenser section 24 and the evaporator section 12 is reduced to a vapor at a pressure somewhere intermediate the operating pressures of the condenser and the evaporator. This flash gas is fed back to the compressor 17 through the drive motor 20 so that it absorbs heat from the drive motor 20, cooling it. The vapor leaves the drive motor 20 and is introduced into the compressor flow at an intermediate point along the compressor flow path.

There is an additional provision provided in the illustrated system for motor cooling. Liquid refrigerant is shunted from the liquid/vapor line 22 directly to the flash gas inlet line 28 to the drive motor 20 by shunt line 26. In the event the drive motor 20 becomes overly warm, the condition is sensed by the system controller and a solenoid valve 30 in the shunt line is opened and liquid refrigerant supplements the economizer flash gas in providing motor cooling. When a desired motor operating temperature is once again attained, the solenoid valve 30 is closed by the system controller.

In the compressor 17, the refrigerant vapor is driven to a desired high temperature and pressure. The discharge gas from the compressor 17 is directed via a discharge line 32 to an oil separator 33 wherein the oil contained in the high pressure gas is removed from the refrigerant vapor. The compressor 17 discharge gas enters the top of the separator shell 34 and is directed against the end wall 35 of the shell so that a good deal of the oil separates out of gas and is collected in the bottom of the tank. The remaining compressor gas then flows through a wire mesh screen 37 where the remaining oil is separated and allowed to drain to the bottom of the tank. An oil return line 36 located in the bottom of the tank which returns the oil collected in the tank to the drive motor 20 under system pressure without the aid of a pump. A small prelube pump 38 is connected in the oil return line by means of a check valve network 39 to insure that sufficient oil pressure is provided to the system prior to start up. The pump is activated for about twenty seconds prior to starting of the compressor 17 and as soon as the system pressure differential reaches a desired level, the pump is shut down.

Refrigerant vapor leaves the oil separator at the outlet 41 located at the top of the tank and is piped via vapor line 43 to the inlet of the condenser section 24. The condenser section of the illustrated cooler system includes two fan coil units 45 and 46 that are mounted adjacent to each other in series flow relationship. The condenser is an air cooled system wherein a plurality of fans 47 are employed to draw ambient air over the heat exchanger fins of the fan coil units. Refrigerant moving through the circuits is reduced to a liquid with the heat of condensation is rejected into the air stream moving over the fan coils.

Liquid refrigerant living in the condenser is piped to the refrigerant inlet port 49 of the economizer 23. The economizer is housed within a vertically disposed steel shell 50 that is attached to a base 54 containing the refrigerant inlet port 49 and refrigerant outlet port 51. An interior standpipe 55 routes the incoming refrigerant to an electronically controlled expansion valve (EXV) 56 which is mounted in the upper section of the upright economizer shell. The EXV serves to rapidly expand the incoming liquid refrigerant to a lower intermediate pressure whereupon the saturated vapor produced by the expansion collects in the upper part of the shell chamber while the liquid phase is collected in the bottom of the shell chamber. As noted above, the vapor developed in the top of the shell is passed back to the compressor 17 through the drive motor 20 by means of flash gas inlet line 28.

The economizer operates at an intermediate pressure somewhere between the condenser pressure and the evaporator pressure. The liquid that is collected in the bottom of the economizer is throttled a second time through adjustable metering orifices located in the interior standpipe 55. Although not shown, a metering sleeve is slidably contained within the interior standpipe 55 and is arranged to be adjustably positioned by a float 57 to control the opening and closing of metering orifices in response to the liquid level in the chamber. The second throttling process further lowers the pressure and temperature of the liquid refrigerant which is then delivered into the cooler 12 via liquid/vapor line 22. The liquid fills the cooler shell, and because of its low temperature state absorbs heat from the water to lower the water temperature to a desired operating level.

The liquid level sensor of the improved cooler of the present invention is provided within the evaporator or cooler 12 and is adapted to send a control signal to the EXV controller 60, which in turn controls the flow of liquid refrigerant to the cooler 12 to maintain the liquid refrigerant level in the cooler 12 at a desired level.

The improved cooler of the present invention is now explained in more detail with reference to the embodiment illustrated in FIG. 2. In this cross-sectional view of the cooler 12, we see the cooler shell 65 surrounding the heat exchanger tubes 15 in order to hold the liquid refrigerant 69 that normally is to be kept (during operation of the chiller system) at a liquid refrigerant level 73 sufficient to cover the heat exchanger tubes 15. In operation, the liquid refrigerant 69 boils, creating vapor refrigerant 71, and causing the liquid refrigerant level 73 to drop, requiring more refrigerant to be fed to the cooler. For best operation, the liquid refrigerant level 73 should be controlled to stay at the proper level above the heat exchanger tubes 15.

The liquid level sensor 67 of the embodiment shown in FIG. 2 is a stainless steel probe 75 inserted through the shell 65 of the flooded cooler 12 so that the end of the probe 75 is just above the highest of the heat exchanger tubes 15. Inside the probe 75 is a heating element 77 and three thermistors 79a, 79b, 79c wired in series. In the embodiment shown, the heating element 77 is a small 24-volt electric heater, and the thermistors 79a, 79b, 79c are negative coefficient thermistors.

When the probe 75 is totally within the vapor refrigerant 71 above the heat exchanger tubes 15, the heating element 77 raises the temperature of the thermistors 79a, 79b, 79c above the saturation temperature of the refrigerant at which the liquid refrigerant 69 is boiling at. As the liquid refrigerant level 73 begins to rise, the liquid refrigerant 69 comes in contact with the outside of the probe 75. Since the heat transfer coefficient of the liquid refrigerant 69 is significantly higher than that of the vapor refrigerant 71, the probe 75 in that area is quickly cooled. This, in turn, increases the resistance of the first negative coefficient thermistor 79a, causing an increase in the overall resistance of the thermistor circuit 81, and changes in various other properties of the thermistor circuit 81 as well (e.g., voltage, current, etc.) as would be well understood by one skilled in the art.

As the liquid refrigerant level 73 continues to rise, the liquid refrigerant 69 contacts the probe 75 in the area of the second and third thermistors 79b, 79c, and further decreases the temperature and increases the resistance of the thermistor circuit. By measuring the resistance or other property of the thermistor circuit, an indication of the liquid refrigerant level 73 or variation thereof can be obtained, and used to control an electronic expansion valve (not shown) to adjust the liquid refrigerant level 73 accordingly. In other embodiments, other control valves could also be used to control the flow of liquid refrigerant.

While the present invention has been particularly shown and described with reference to the preferred mode as illustrated in the drawing, it will be understood by one skilled in the art that various changes in detail may be effected therein without departing from the spirit and scope of the invention as defined by the claims. For example, the invention can be practiced using a single thermistor instead of multiple thermistors, or the thermistors can be placed in parallel, or in other circuit arrangements. Other types of heaters can be used with the probe, as well.

We claim:

1. A method for measuring variation in the liquid refrigerant level of a refrigerant within a cooler, comprising the steps of:

positioning a heat exchanger within a cooler shell so that an area within the cooler shell is above the heat exchanger;

positioning a probe, comprising a heating element and a plurality of thermistors comprised by at least one thermistor circuit, so that the probe extends at least to a point above the heat exchanger;

activating the heating element to provide heat that acts upon the thermistor; and measuring a property of the thermistor circuit to monitor for variation of the liquid refrigerant level.

2. The method as recited in claim 1, further including the step of wiring said plurality of thermistors in series.

3. The method as recited in claim 1, wherein said plurality of thermistors comprises at least three thermistors.

4. The method as recited in claim 1, wherein
said plurality of plurality of thermistors comprises at least three thermistors, and
further including the step of wiring said three thermistors in series.

5. The method as recited in claim 1, wherein said probe is positioned to extend at least from a top of said cooler shell to said point above said heat exchanger.

6. The method as recited in claim 5, further including the step of wiring said plurality of thermistors in series.

7. The method as recited in claim 5, wherein said plurality of thermistors comprises at least three thermistors.

8. The method as recited in claim 5, wherein
said plurality of thermistors comprises at least three thermistors, and
further including the step of wiring said three thermistors in series.

* * * * *